(12) United States Patent
Asahina

(10) Patent No.: US 7,969,855 B2
(45) Date of Patent: Jun. 28, 2011

(54) READ-ONLY OPTICAL DISC MEDIUM AND METHOD OF FABRICATING THE SAME

(75) Inventor: Takayuki Asahina, Shizuoka (JP)

(73) Assignee: Sony Corporation, Tokyo (JP)

( * ) Notice: Subject to any disclaimer, the term of this patent is extended or adjusted under 35 U.S.C. 154(b) by 723 days.

(21) Appl. No.: 12/023,655

(22) Filed: Jan. 31, 2008

(65) Prior Publication Data

US 2008/0186838 A1    Aug. 7, 2008

(30) Foreign Application Priority Data

Feb. 1, 2007    (JP) .................................. 2007-022865

(51) Int. Cl.
*G11B 7/00* (2006.01)
(52) U.S. Cl. ................. 369/275.3; 369/47.53; 369/44.11
(58) Field of Classification Search ........................ None
See application file for complete search history.

(56) References Cited

U.S. PATENT DOCUMENTS

| | | | | |
|---|---|---|---|---|
| 5,136,569 | A | * | 8/1992 | Fennema et al. ........... 369/53.23 |
| 5,703,867 | A | * | 12/1997 | Miyauchi et al. .......... 369/59.11 |
| 6,009,058 | A | * | 12/1999 | Sims et al. ................. 369/53.28 |
| 6,704,273 | B1 | | 3/2004 | Koide |
| 6,788,635 | B1 | | 9/2004 | Aratani et al. |
| 7,072,260 | B1 | * | 7/2006 | Sako et al. ................. 369/53.21 |
| 7,236,439 | B2 | | 6/2007 | Usui et al. |
| 7,488,701 | B2 | * | 2/2009 | Mizukami et al. ............ 503/201 |
| 2002/0110065 | A1 | * | 8/2002 | Wang et al. ................. 369/47.53 |
| 2004/0148623 | A1 | * | 7/2004 | Rijpers et al. ................. 720/718 |

FOREIGN PATENT DOCUMENTS

| | | |
|---|---|---|
| EP | 1 122 723 | 8/2001 |
| EP | 1 394 779 | 3/2004 |
| JP | 2000-152178 | 5/2000 |
| JP | 2001/135021 | 5/2001 |
| JP | 2003-141821 | 5/2003 |
| JP | 2003-331430 | 11/2003 |
| JP | 2004-005919 | 1/2004 |
| JP | 2006-134385 | 5/2005 |
| JP | 2005-216395 | 8/2005 |
| JP | 2006-079773 | 3/2006 |
| JP | 2006-155714 | 6/2006 |
| JP | 2001-135021 | 7/2006 |
| WO | 01-08145 | 2/2001 |
| WO | 02/099798 | 12/2002 |
| WO | 02-101733 | 12/2002 |
| WO | 02/101733 | 12/2002 |
| WO | 2005/001823 | 1/2005 |
| WO | 2008/062675 | 5/2008 |

OTHER PUBLICATIONS

European Search Report Corresponding to 08001737.9-1232 dated Mar. 26, 2009.

* cited by examiner

*Primary Examiner* — Van N Chow
(74) *Attorney, Agent, or Firm* — K&L Gates LLP

(57) ABSTRACT

A read-only optical disc medium is disclosed. The disc medium includes: an information recording area in which information is recorded by means of an embossed pit array formed in a convexo-concave shape having a reflective layer deposited thereon; a test writing area which is used for test write recording of a mark formed by dissipating or decreasing the reflective layer; and an additional write area in which a record data string is formed of a mark by dissipating or decreasing the reflective layer under a recording condition decided in accordance with a result of test write recording performed in the test writing area.

12 Claims, 10 Drawing Sheets

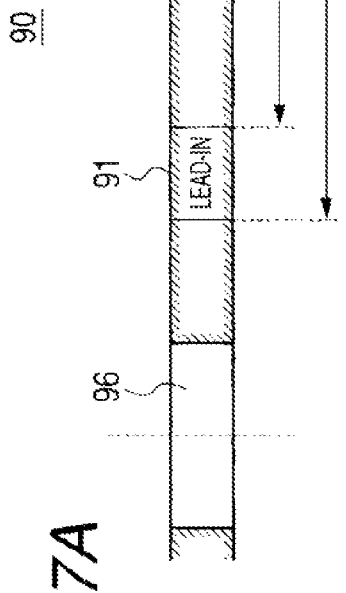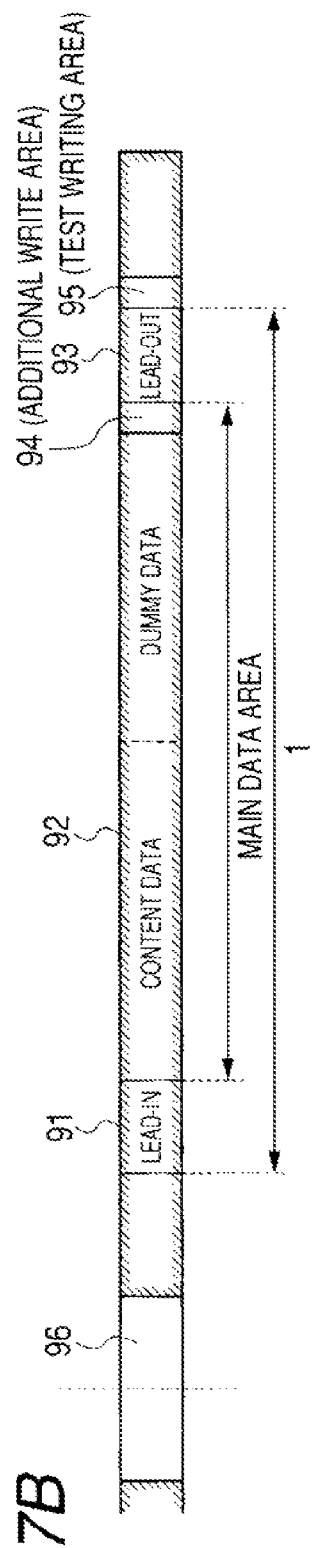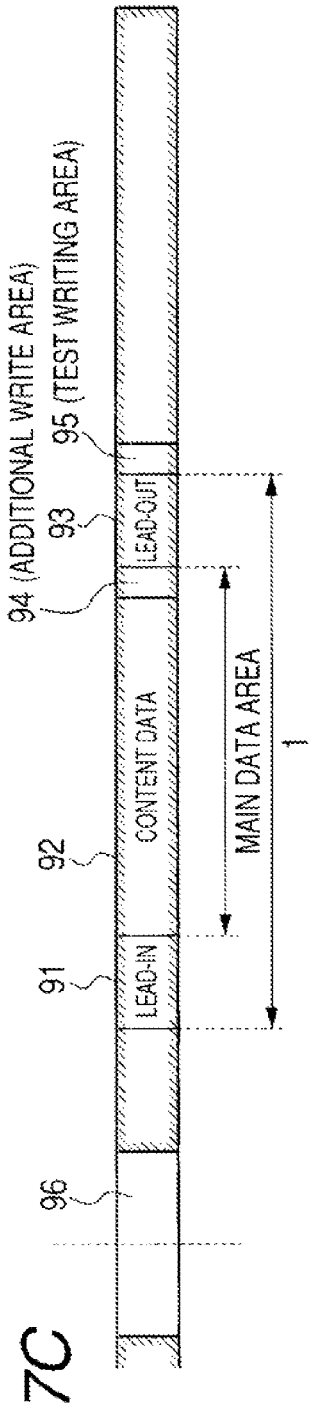
FIG. 7A
FIG. 7B
FIG. 7C

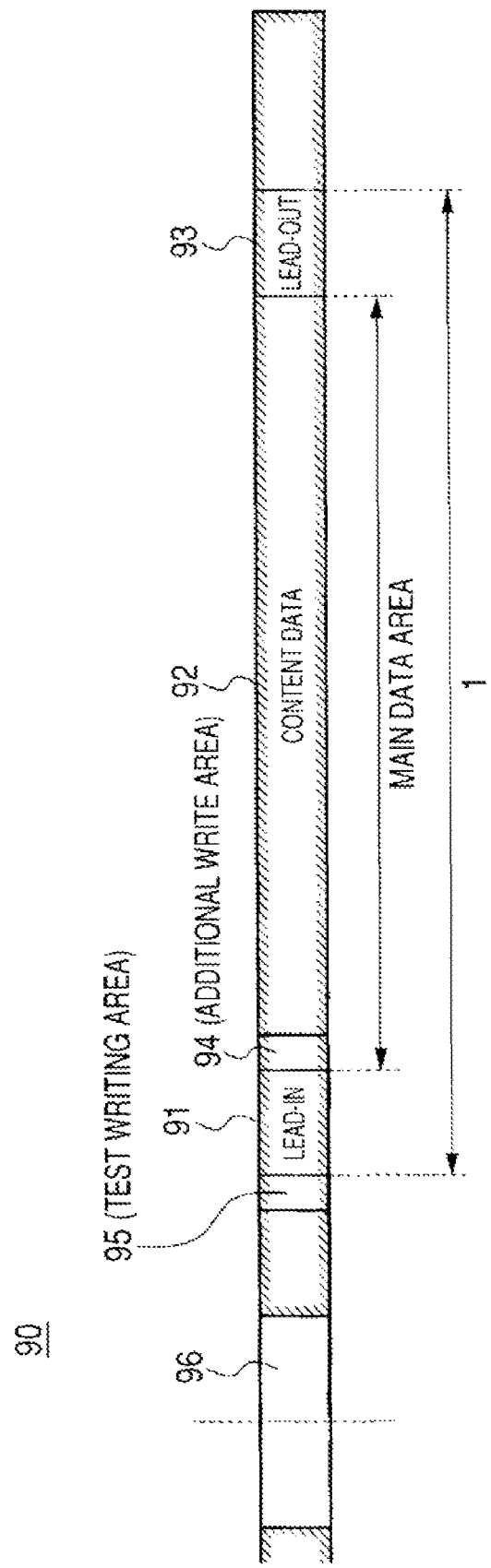

READ-ONLY OPTICAL DISC MEDIUM AND METHOD OF FABRICATING THE SAME

CROSS REFERENCES TO RELATED APPLICATIONS

The present application claims priority to Japanese Patent Application JP 2007-022865 filed in the Japanese Patent Office on Feb. 1, 2007, the entire contents of which being incorporated herein by reference.

BACKGROUND

The present application relates to a read-only optical disc medium, and a method of fabricating the same. More specifically, the present application relates to a technique in which unique information can be separately provided to read-only optical disc media to be fabricated.

Examples of the related art include JP-A-2001-135021 (Patent Reference 1), WO 01/008145 (Patent Reference 2) and WO 02/101733 (Patent Reference 3).

For example, in playback only optical disc media, that is, ROM (Read Only Memory) optical disc media such as CDs (Compact Disc), DVDs (Digital Versatile Disc), BDs (Blu-ray disc (trademark)) and HD-DVDs (High Definition DVD), a lead-in area, a main data area and a lead-out area are formed on an optical disc from the inner track side to the outer track side.

Then, music, video, game, an application program, and the other information data are recorded in the main data area in accordance with a predetermined recording modulation mode. In addition, in the lead-in area, various items of management information are recorded including information for reproduction management of information data recorded in the main data area and physical information about a disc.

For example, many content holders use these read-only optical disc media as a means of providing contents because of low production costs due to excellent mass-productivity.

A DVD is taken as an example. The fabrication process steps of a read-only optical disc medium are roughly categorized into three processes: a mastering process in which an optical disc master is prepared with laser beams; a shaping and deposition process in which a stamper prepared from the optical disc master is used to produce a number of disc substrates and then a layer is formed on the disc substrates; and a bonding process in which two optical discs having a thickness of 0.6 mm, which make a pair, are bonded to each other with an adhesive having a predetermined thickness to form a DVD disc medium having a thickness of 1.2 mm.

The disc substrates mass-produced with the stamper in the shaping and deposition process have a convexo-concave patterns transferred from those formed on the stamper. In other words, on the portion to be the information recording surface, a record data string (embossed pit array) by pits and lands as a convexo-concave shape pattern is formed, and the record data string forms spiral or concentric recording tracks. On information recording surface on which pits and lands are formed, a metal alloy reflective layer is deposited on the convexo-concave shape.

After the disc is completed, laser light applied from a reproducing apparatus is reflected in the portions of pits and lands by the reflective layer.

It is not intended to additionally record information on the read-only optical disc after it is fabricated. In addition, as described above, a reflective layer is deposited on the information recording surface, but it is not considered to use the reflective layer as a recording layer.

Here, in recent years, in order to manage read-only optical discs on which a predetermined item of information data is recorded, such a method is demanded that additional information such as a unique ID number is recorded for every read-only optical disc to be fabricated.

However, in the read-only optical disc medium fabricated in accordance with the processes described above, it is difficult to record additional information with no influence on information data configured of an embossed pit array already formed.

On this account, in the modes proposed before in which additional information such as an ID number is recorded on a read-only optical disc, almost all of the modes have a premise that additional information is recorded in the area other than the information recording area (the lead-in area, the main data area and the lead-out area), or the modes adopt a scheme in which additional information is recorded in accordance with a mode different from a recording modulation mode of main signals (signals recorded with pits and lands transferred from a stamper).

However, in the read-only optical disc on which additional information is recorded in accordance with these schemes, the read-only optical disc has a premise that additional information data has signal output or the modulation mode different from that of the main signal, or that data is read out of the area other than the information recording area. Therefore, it is difficult to read data by a reproducing apparatus other than a reproducing apparatus having an exclusive read function, which causes the situations that it is difficult to read additional information by existing reproducing apparatuses, leading to a problem of poor compatibility.

For example, a BCA (Burst Cutting Area) defined by the DVD-ROM standards is recorded in the area on the inner track side than the lead-in area is provided in accordance with a recording modulation mode different from that of the main signal. On this account, it is necessary to use a reproducing apparatus having an exclusive read function.

In addition, Patent Reference 1 describes that an area other than an information recording area is selected in recording additional information.

Moreover, Patent Reference 2 discloses that in order to read the signals of recorded additional information, a reflectance difference is used between a portion on which existing information is recorded and an area on which additional information is recorded. In this case, it is necessary to use a reproducing apparatus having an exclusive read function.

In view of these situations, it is demanded that additional information is recorded in accordance with the same modulation mode as that of main signals in the information recording area formed of the lead-in area, the main data area and the lead-out area, that is, in the area in which information is recorded with an embossed pit array.

SUMMARY

Thus, it is desirable to provide a scheme for a read-only optical disc medium in which disc substrates having the same recording descriptions are formed in the shaping and deposition process and then additional information can be recorded on the individual discs, and to allow proper recording of additional information in a main data area, for example.

A read-only optical disc medium according to an embodiment includes an information recording area in which information is recorded by means of an embossed pit array in a convexo-concave shape having a reflective layer deposited thereon; a test writing area which is used for test write recording of a mark formed by dissipating or decreasing the reflective layer; and an additional write area in which a record data string is formed of a mark by dissipating or decreasing the reflective layer under a recording condition decided in accordance with a result of test write recording performed in the test writing area.

In the information recording area, a lead-in area, a main data area and a lead-out area are formed from an inner track side to an outer track side. In addition, in the main data area, content data and dummy data are recorded.

In addition, the test writing area is provided on the outer track side or on the inner track side than the lead-out area is provided.

In addition, the additional write area is provided near a position of a terminal end of the main data area or near a position of a beginning end of the main data area.

In addition, the additional write area is provided on the inner track side of the lead-out area, and the test writing area is provided on the outer track side thereof, as the lead-out area is sandwiched.

In addition, the additional write area is provided on the outer track side of the lead-in area, and the test writing area is provided on the inner track side thereof, as the lead-in area is sandwiched.

A method of fabricating a read-only optical disc medium according to an embodiment includes forming an optical disc master having a convexo-concave shape thereon based on an information signal and having a flat area to be a test writing area and an additional write area; shaping a disc substrate having the convexo-concave shape and the flat area on an information recording surface thereof by using a stamper prepared from the optical disc master; depositing a reflective layer on the information recording surface to form an embossed pit array in the convexo-concave shape having the reflective layer deposited thereon and the test writing area and the additional write area as the flat area having the reflective layer deposited thereon; and performing test write of a mark formed by dissipating or decreasing the reflective layer in the test writing area, forming a mark by dissipating or decreasing the reflective layer in the additional write area under a recording condition decided in accordance with a result of the test write recording, and forming a record data string formed of the mark.

In other words, according to an embodiment, in the step of producing a large number of disc substrates by using a stamper, a lead-in area, a main data area and a lead-out area are formed as areas in which information is recorded with an embossed pit array, in which a test writing area and an additional write area are formed at predetermined positions. The test writing area and the additional write area are formed as a flat area in which no embossed pit array are formed. For example, a reflective layer formed of a metal alloy is deposited on the information recording surface including the flat area like this.

Then, after that, a mark is formed in the additional write area by dissipating or decreasing a part of the reflective layer (for convenience of description, referred to as a perforated mark), whereby additional information is recorded. For example, the additional write area is provided near the position of the terminal end of the main data area or near the position of the beginning end thereof.

Here, for example, in the case in which the additional write area is provided in the main data area and additional information is recorded with perforated marks, it is demanded that the record data string formed of the perforated marks has to be reproduced as similar to a typical embossed pit array. To this end, it is necessary to properly form the perforated marks. Then, the test writing area is provided on the outer track side than the lead-out area is provided, or on the inner track side than the lead-in area is provided, and test write of recording the perforated marks is allowed. In accordance with this test write, the recording conditions such as laser power or strategy in forming the perforated marks are decided, whereby additional information is properly recorded.

In addition, preferably, the test writing area and the additional write area are provided at the positions physically close to each other.

In the microscopic view, it is difficult to uniformly form the reflective layer throughout the information recording surface on the disc substrate, and generally, the irregularities occur such as variations in the thickness.

In consideration of this, it can be said that the recording conditions decided by test write in the test writing area are reflected in the area close to the test writing area. On this account, preferably, the test writing area and the additional write area are provided at the positions physically close to each other such as the test writing area and the additional write area on the outer track side and the inner track side of the lead-out area, respectively, as the lead-out area is sandwiched, or on the inner track side and the outer track side of the lead-in area, respectively, or the lead-in area is sandwiched.

According to an embodiment, the additional write area is provided on the read-only optical disc medium, and data as additional information is recorded as a record data string formed of marks (perforated marks) made by dissipating or decreasing a part of the reflective layer. Thus, unique additional information can be recorded on the individual discs of read-only optical disc media.

Furthermore, since the perforated marks are recorded, test write recording is performed in the test writing area to decide the optimum recording conditions. The perforated marks are recorded under the optimum recording conditions, whereby additional information is recorded properly. Therefore, unique additional information can be recorded on individual discs as information that can be reproduced in typical reproducing apparatuses (reproducing apparatuses with no special read function).

In addition, the test writing area and the additional write area are provided at the positions physically close to each other such as the test writing area and the additional write area provided on the outer track side and the inner track side of the lead-out area, respectively, as the lead-out area a is sandwiched, or on the inner track side and the outer track side of the lead-in area, respectively, as the lead-in area is sandwiched, whereby the recording conditions decided in accordance with test write recording become more proper recording conditions for recording perforated marks in the additional write area, and the read-only optical disc medium according to the embodiment of the application has additional information of higher quality recorded thereon.

Additional features and advantages are described herein, and will be apparent from, the following Detailed Description and the figures.

BRIEF DESCRIPTION OF THE FIGURES

FIGS. 7A to 7C show an illustration depicting an additional write area and a test writing area according to an embodiment;

FIG. 8 shows an illustration depicting an additional write area and a test writing area according to the embodiment;

DETAILED DESCRIPTION

Embodiments will be described below in greater detail with reference to the drawings. The embodiments exemplify a read-only optical disc medium as a read-only optical disc of the DVD format.

First, the fabrication process steps of a read-only optical disc 90 according to the embodiment will be described with reference to FIG. 1.

Figure 1:
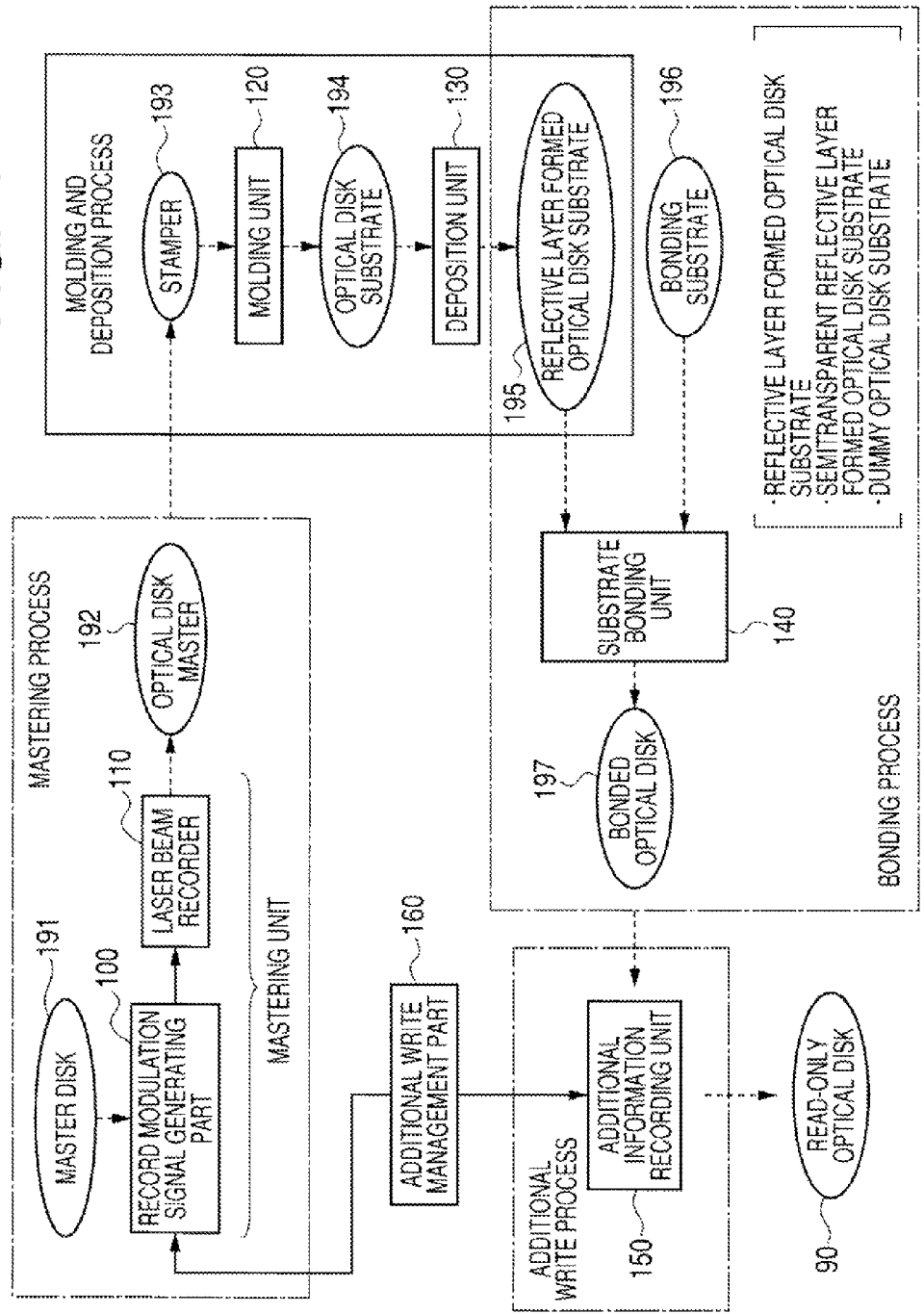
FIG. 1 shows an illustration depicting disc fabrication process steps according to an embodiment.

FIG. 1 shows the process steps of fabricating a read-only optical disc according to the embodiment as a DVD. As shown in the drawing, the disc fabrication process steps in the embodiment are roughly categorized into three processes: a mastering process in which an optical disc master is prepared with laser beams; a shaping and deposition process in which a stamper prepared from the optical disc master to produce a number of disc substrates and a layer is formed on the disc substrates; a bonding process in which two optical discs having a thickness of 0.6 mm, which make a pair, are bonded to each other with an adhesive having a predetermined thickness to form an optical disc medium having a thickness of 1.2 mm; and an additional write process in which additional information such as identification information is recorded on each pair of bonded optical discs.

Hereinafter, the processes will be described.

The mastering process is a process in which an optical disc master 192 is produced based on information data recorded on a master disc 191. In this process, a mastering unit is used that has a record modulation signal generating part 100 and a laser beam recorder 110.

The record modulation signal generating part 100 reproduces the master disc 191 to read information data to record, the signals of the read information data are modulated into EFM+ (Eight to Fourteen Modulation plus) signals, and outputs the generated EFM+ signals to the laser beam recorder 110.

The optical disc master 192 is a disc that a glass plate is coated with a photoresist of a photosensitive material. The laser beam recorder 110 applies laser light onto the optical disc master 192 in accordance with the supplied EFM+ signals, and exposes pit patterns based on the EFM+ signals. After that, in the case of a positive resist, the photoresist layer is developed, the exposed portions are molten to form a convexo-concave pattern on the photoresist layer, and then the pit patterns (the convexo-concave shape of pits and lands) in accordance with a predetermined form are produced on the surface of the optical disc master 192.

Moreover, as described above, the record modulation signal generating part 100 generates the EFM+ signals based on the signals read out of the master disc 191, and sends the signals to the laser beam recorder 110. The record modulation signal generating part 100 inserts unmodulated signals into a specific period of the EFM+ signals continuously sent, based on an instruction from an additional write management part 160.

In the timing period of the unmodulated signal, laser light is turned into the off period in the laser beam recorder 110. In other words, the unmodulated signals are inserted into the EFM+ signals, whereby unexposed sections are formed on the optical disc master 192. All of these sections are formed into lands that are flat areas with no convexo-concave shape, which become an additional write area and a test writing area, described later.

Based on the optical disc master 192, a mold is prepared that is referred to as a stamper 193 on which the pit patterns of the optical disc master 192 are transferred in reverse. Of course, the stamper 193 is also formed with flat areas to be an additional write area and a test writing area.

Subsequently, in the shaping and deposition process, first, a molding unit 120 uses the stamper 193 to prepare an optical disc substrate 194. The convexo-concave pattern formed on the optical disc master 192 are transferred onto the optical disc substrate 194 to form pit patterns.

For the preparation method of the optical disc substrate 194, compression molding, injection molding, photo-curing and so on are known.

To the optical disc substrate 194 to which the pit patterns are transferred from the stamper 193, the deposition unit 130 then deposits a coating layer such as a reflective layer thereon, whereby a reflective layer formed optical disc substrate 195 is formed.

Subsequently, in the bonding process, the reflective layer formed optical disc substrate 195 is bonded to a bonding substrate 196.

For the bonding substrate 196, the following disc substrates are used: a reflective layer formed optical disc substrate prepared by the similar process steps as those described above, or a semitransparent reflective layer formed optical disc substrate, or a dummy optical disc substrate with no reflective layer deposited thereon.

A substrate bonding unit 140 bonds any one of the bonding substrates 196 described above to the reflective layer formed optical disc substrate 195 to produce a bonded optical disc 197.

For the bonding scheme in bonding, such schemes are known: a scheme of using an ultraviolet curing resin, or a scheme of using a sheet with an adhesive.

In the DVD before, the bonded optical disc 197 is a DVD as a completed product. However, in this embodiment, as discussed above, in a part of the section on the recording track on which pit patterns (embossed pit array) are formed, the additional write area and the test writing area are provided on which no pit patterns are formed.

Then, the additional write process is performed on the bonded optical disc 197. In the additional write process, an additional information recording unit 150 writes additional information in the additional write area on the bonded optical disc 197. For example, identification information different in every optical disc is written as additional information. However, before additional information is written in the additional write area, test write is performed in the test writing area, and the recording conditions, for example, a suitable laser power is decided depending on the result of the test write recording.

Then, under the decided recording conditions, additional information is to be recorded in the additional write area.

The additional information recording unit 150 is instructed of the position information (address) of the test writing area and the additional write area by the additional write management part 160 as well as provided with additional information to write, and then the unit 150 writes the additional information.

In this case, the additional information recording unit 150 writes additional information in accordance with this scheme in which the unit 150 modulates additional information into EFM+ signals as well as applies high power laser pulse for recording based on the EFM+ signals and dissipates or decreases the reflective layer in the test writing area and the additional write area to form perforated marks.

Moreover, the configuration of the additional information recording unit 150 and specific examples of the process steps of test write recording and additional information write will be described in FIGS. 9 and 10.

The additional write process as described above is finished to complete the fabrication of the read-only optical disc 90. The read-only optical discs 90 mass-produced in the process steps above are optical discs on which contents having the same descriptions (music, video, game, application program and so on) are recorded as well as they are optical discs on which unique additional information is recorded separately on the individual discs.

The read-only optical disc 90 (DVD) according to the embodiment thus fabricated will be described.

Figure 2:
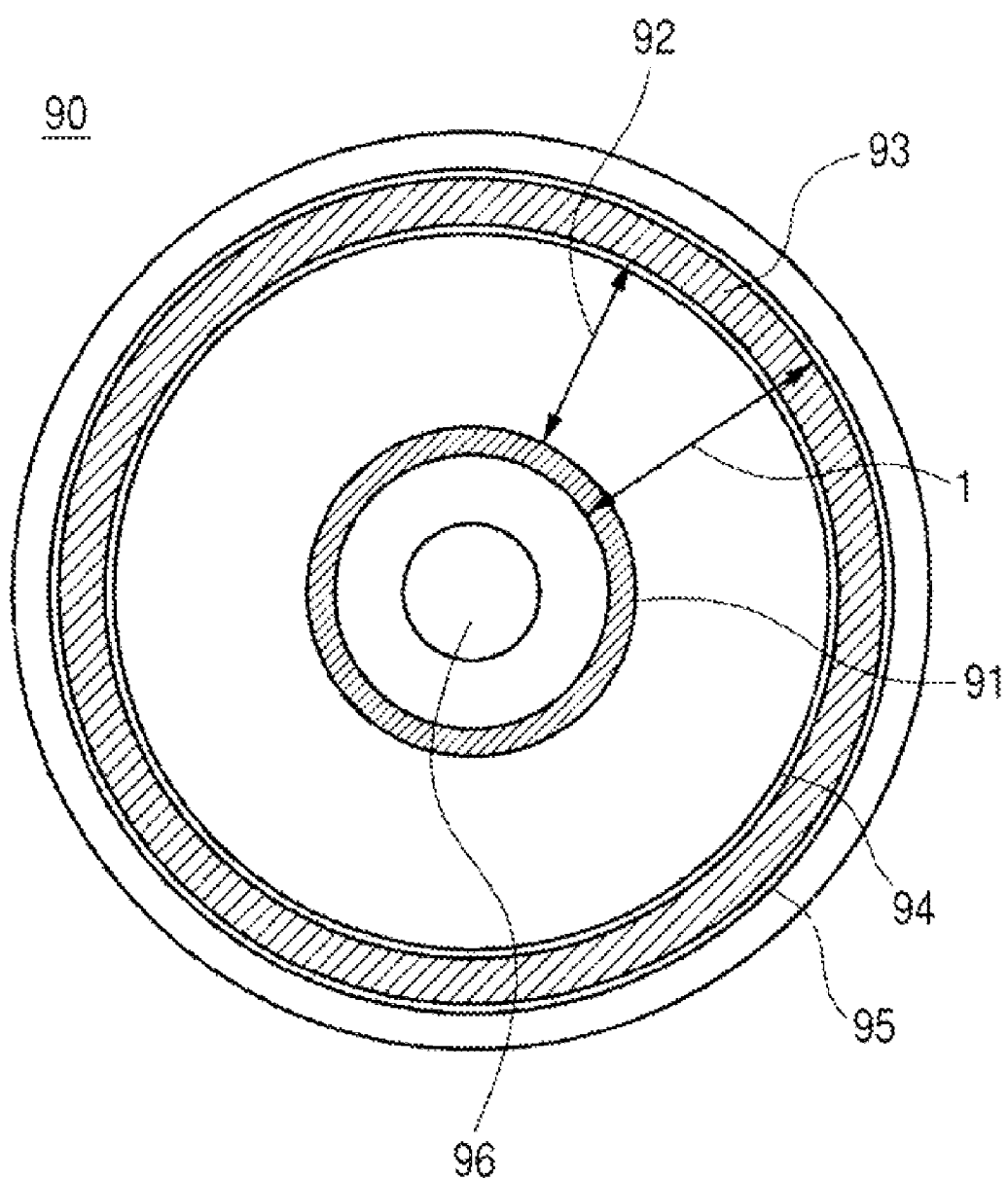
FIG. 2 shows a plan view depicting a read-only optical disc according to an embodiment.

FIG. 2 shows a plan view depicting the read-only optical disc 90. The read-only optical disc 90 is a disc having a diameter of 12 cm, and a center hole 96 is formed at the center thereof. On the disc surface, an information recording area 1, shown in the drawing, is the area in which information is recorded with embossed pit array. In other words, the information recording area 1 is the area in which recorded data strings formed of pits and lands based on the EFM+ signals are formed as a recording track in, for example, a spiral shape as well as the information recording area 1 is the area including a lead-in area 91 in which management information is recorded, a main data area 92 in which content data is recorded, and a lead-out area 93.

However, in the read-only optical disc 90 according to the embodiment, an additional write area 94 is provided in the information recording area 1 in which additional information is recorded with perforated marks. In the example shown in FIG. 2, the additional write area 94 is formed in the area near the terminal end of the main data area, that is, the area 94 is formed as the area right before the lead-out area 93.

Furthermore, the test writing area 95 is provided as the area in which test write is performed before perforated marks are recorded in the additional write area 94. In the example shown in FIG. 2, the test writing area 95 is formed as the area on the outer track side of the lead-out area 93.

In other words, the additional write area 94 and the test writing area 95 are provided on the inner track side and the outer track side of the lead-out area 93, respectively, as the lead-out area 93 is sandwiched.

Embossed pit arrays and perforated marks formed on the read-only optical disc 90 will be described.

Figure 3A:
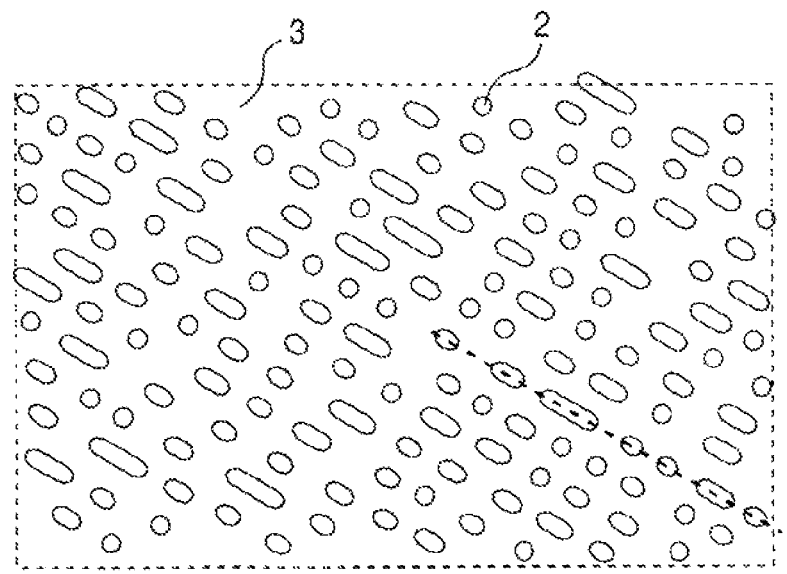
FIGS. 3A and 3B show a partially enlarged diagram and a cross section schematically depicting the read-only optical disc according to the embodiment.
Figure 3B:
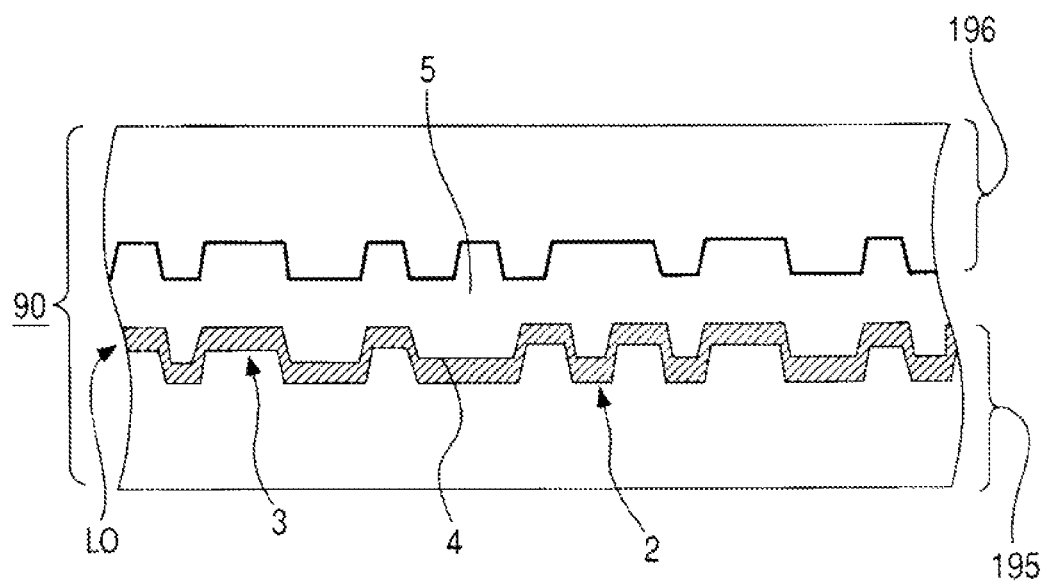

FIG. 3A shows a portion that a part of the information recording area 1 is enlarged in which recording tracks are formed as embossed pit arrays formed of typical pits and lands. FIG. 3B shows a cross section schematically depicting the portion indicated by a broken line shown in FIG. 3A.

As revealed from FIG. 3B, for example, the read-only optical disc 90 is formed in which the reflective layer formed optical disc substrate 195 and the bonding substrate (dummy optical disc substrate) 196, each of them formed of polycarbonate having a thickness of 0.6 mm, are bonded to each other with the adhesive 5 (for example, an ultraviolet curing resin or an adhesive sheet) and the read-only optical disc 90 is formed to have a thickness of 1.2 mm.

In this case, one main surface of the reflective layer formed optical disc substrate 195 is an information recording surface L0, and the information recording surface L0 is formed to have a convexo-concave pattern with pits 2 and lands 3. In addition, the pits 2 and the lands 3 have a reflective layer 4 on the surfaces thereof.

Moreover, the projections and recesses of the pit 2 and the land 3 may be formed in reverse.

In FIG. 3B, the bonding substrate 196 to be bonded to the reflective layer formed optical disc substrate 195 is a dummy optical disc substrate (a disc substrate on which no reflective layer is deposited). However, as described above, for the bonding substrate 196, a reflective layer formed optical disc substrate or a semitransparent reflective layer formed optical disc substrate may be used as a bonding substrate 196.

The adhesive 5 is typically optical transparent, but it may not be optical transparent depending on the structures. In the case in which the bonding substrate 196 bonded to the reflective layer formed optical disc substrate 195 has a reflective layer or a semitransparent reflective layer thereon, the bonding surface thereof is the surface on which the reflective layer or the semitransparent reflective layer is formed.

Figure 4A:
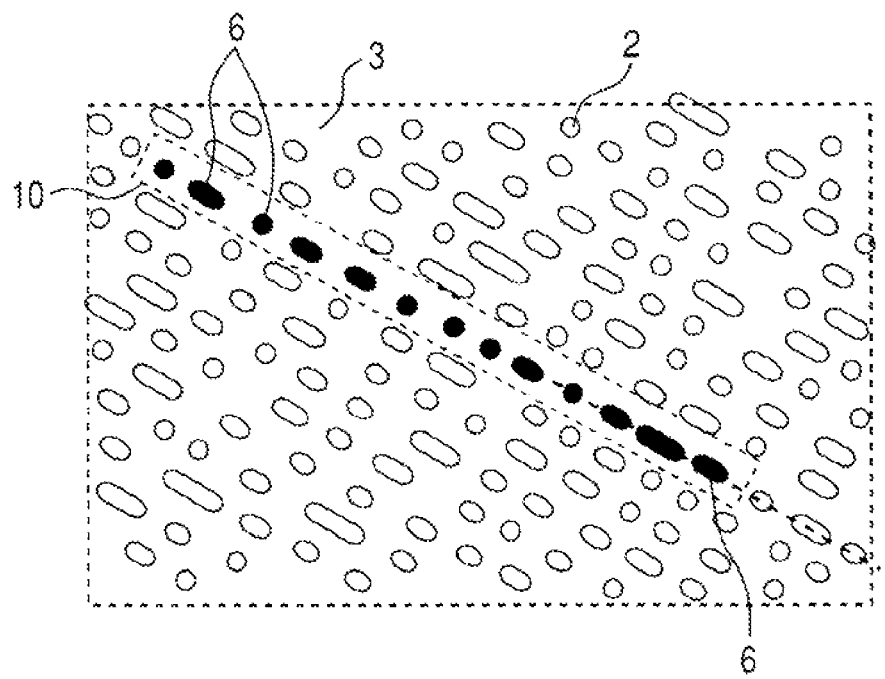
FIGS. 4A and 4B show a partially enlarged diagram and a cross section schematically depicting the read-only optical disc according to an embodiment.
Figure 4B:
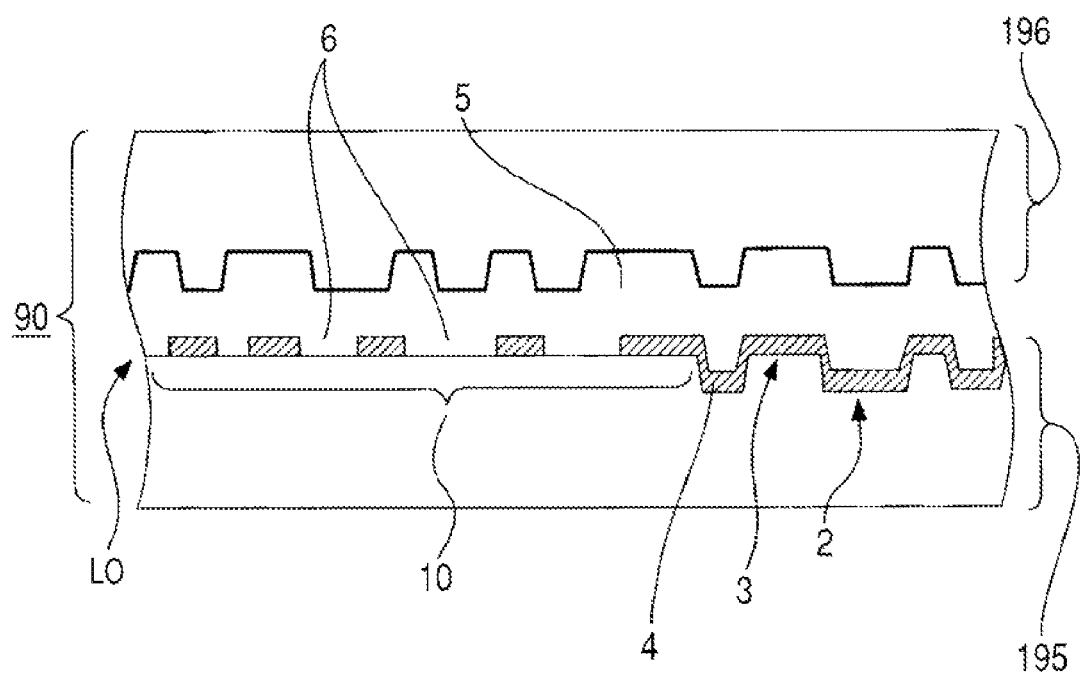

Next, FIG. 4A shows an enlarged diagram depicting a portion in which perforated marks are formed, and FIG. 4B shows a cross section schematically depicting a portion surrounded by a broken line shown in FIG. 4A.

Moreover, here, for the comparison with the embossed pit array, it is depicted that perforated marks 6 are formed in an area 10 in a part of a single track.

As discussed above, additional information is recorded in the additional write area 94 with perforated marks 6. The range of the additional write area 94 may be a range of a single to a few circles of tracks, or may be many circles of tracks, or may be a part of a single circle of a track as shown in FIG. 4A. Furthermore, in the additional write area 94, a plurality of tracks may be formed in which embossed pit arrays and a perforated pit array are mixed and perforated marks 6 are formed in a part of a single circle of track.

Diverse schemes can be considered on the size of the additional write area 94 and how perforated marks 6 are formed depending on a data volume of additional information to record and a tracking mode of the additional information recording unit 150, for example.

For instance, in the example shown in FIG. 4A, a record data string formed of perforated marks 6 perforated in the additional write process is formed in a part of the area 10 on a certain track. In other words, additional information unique to the disc is recorded as a record data string with the perforated marks 6.

As shown in FIG. 4B, although the basic layer structure is the same as that shown in FIG. 3B, the perforated marks 6 are formed in a part of the information recording surface L0. In other words, the perforated marks 6 are formed in such a way that a metal alloy reflective layer 4 is dissipated or decreased for almost no existence.

Figure 5A:
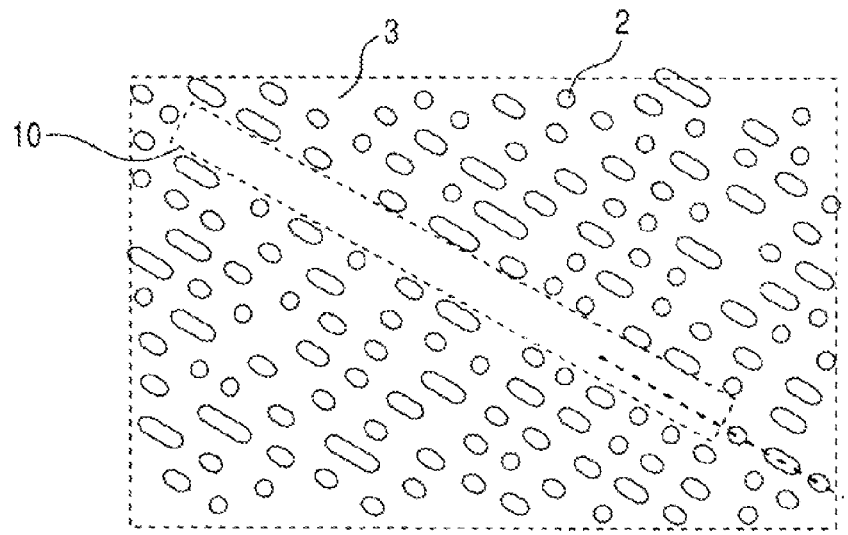
FIGS. 5A and 5B show a partially enlarged diagram and a cross section schematically depicting the read-only optical disc according to an embodiment before additional information is recorded.
Figure 5B:
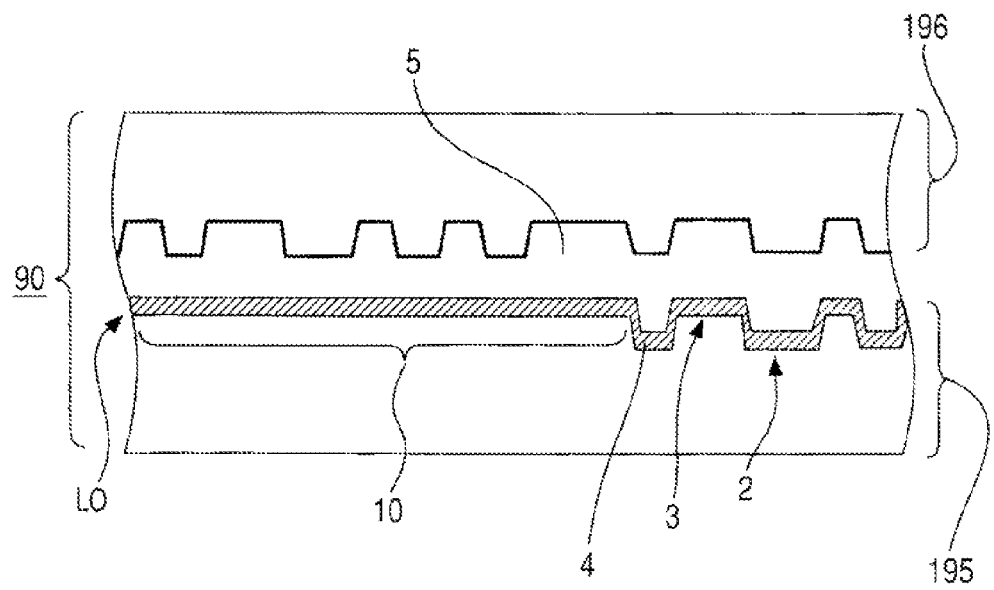

FIGS. 5A and 5B show a portion before additional information is recorded in the additional write process, as corresponding to FIGS. 4A and 4B.

As shown in FIG. 5A, an area 10 is a flat area serving as an unmodulated section in which no convexo-concave pattern with pits 2 and lands 3 is formed. As apparent from FIG. 5B, the area 10 exists on the same plane as the land 3, on which a reflective layer 4 is deposited to form a so-called mirror part.

In the area 10 thus formed, additional information is recorded in the additional write process.

In other words, for example, the additional information recording unit 150 is prepared as an exclusive recording unit using high power red semiconductor laser with a function of emitting high power laser pulses for recording in a desired section, in which data is recorded in the area 10 shown in FIGS. 5A and 5B to form the perforated marks 6 as shown in FIGS. 4A and 4B. For the modulation of light emitting patterns at this time, EFM+ signals are used as the same modulation mode as the modulation mode corresponding to the embossed pit array.

Figure 6:
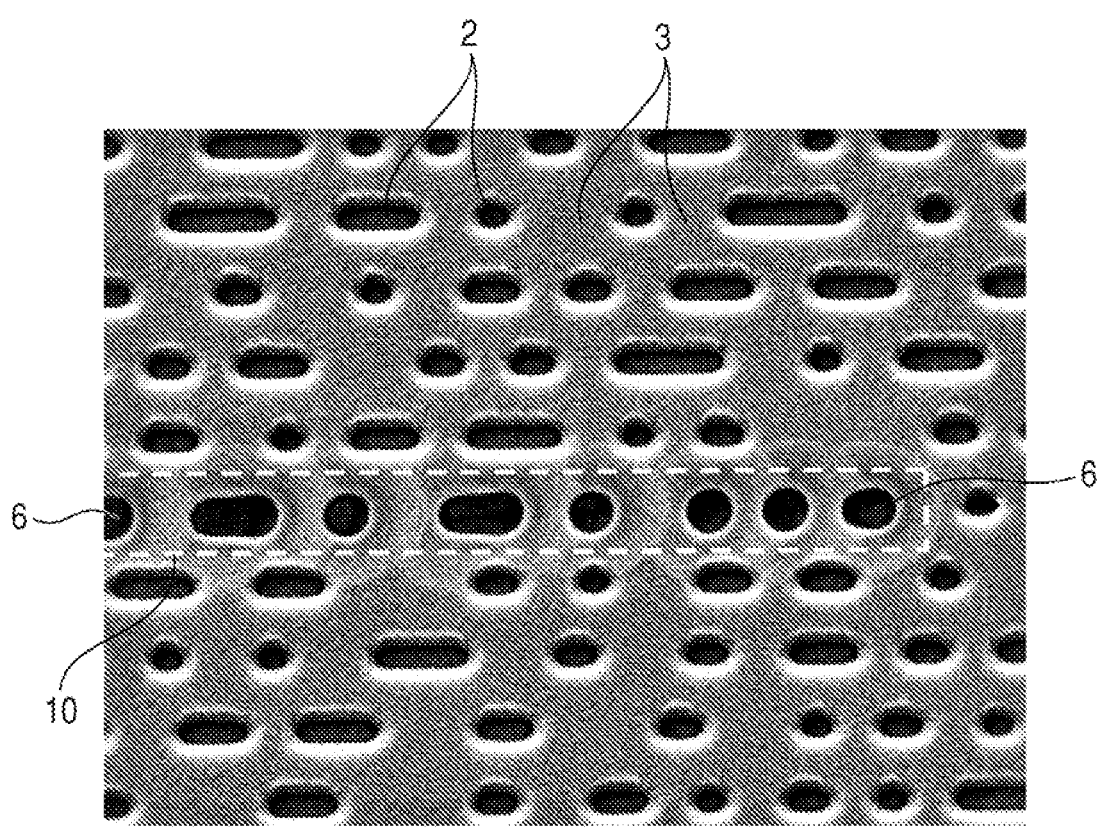
FIG. 6 shows an illustration using an SEM photograph of a portion of the read-only optical disc according to an embodiment on which additional information is recorded.

FIG. 6 shows a sample that high power laser is applied to form perforated marks 6 as additional information recorded in an area 10 on the read-only optical disc 90. This is an SEM (scanning electron microscope) photograph of the area 10 in which the perforated marks 6 are formed.

In SEM observation, it was observed that the reflective layer formed optical disc substrate 195 was peeled off from the bonding substrate 196 (dummy optical disc substrate) in the bonding surface and electron beams were applied onto a portion in which the reflective layer 4 was exposed. For the reflective layer 4, an Al alloy was used that Al was used as a base alloy containing about 1 atom percent of Fe and about five atom percent of Ti.

As apparent from FIG. 6, the metal alloy reflective layer formed in the area 10 is dissipated or decreased in accordance with modulation signals of additional information to make holes in an ellipse and the perforated marks 6 corresponding to pits are formed excellently.

As an area in which additional information is recorded with the perforated marks 6 thus formed, the additional write area 94 is provided as described in FIG. 2. In addition, as an area in which test write of perforated marks 6 is performed before writing data in the additional write area 94, the test writing area 95 is provided.

In FIGS. 7A to 7C and FIG. 8, exemplary arrangements of the additional write area 94 and the test writing area 95 will be described.

FIG. 7A shows an arrangement in which areas are arranged in the disc radial direction. FIG. 7A corresponds to FIG. 2. In other words, in the information recording area 1, a lead-in area 91, a main data area 92 and a lead-out area 93 are provided from the inner track side, and an additional write area 94 is formed near the terminal end part of the main data area 92. In addition, a test writing area 95 is provided on the outer track side of the lead-out area 93.

In the case of FIG. 7A, in the main data area 92, content data such as music, video, a game program, and an application program is recorded right before the additional write area 94.

On the other hand, naturally, the data volume of content data is varied depending on every disc title. In some cases, the data volume of content data is small and the radial position of the terminal end of content data is sometimes positioned considerably on the inner track side case by case, as shown in FIG. 7B. In the example shown in FIG. 7B, dummy data is recorded in succession to content data. The terminal end of dummy data is followed by the additional write area 94, the lead-out area 93 and the test writing area 95.

In addition, FIG. 7C shows an example in which an additional write area 94 is provided from the terminal end of content data without recording dummy data and a lead-out area 93 and a test writing area 95 are formed in the train of the additional write area 94, in the case in which the data volume of content data is small.

In all the examples shown in FIGS. 7A, 7B and 7C, the additional write area 94 and the test writing area 95 are positioned on the inner track side and the outer track side of the lead-out area 93, respectively, as the lead-out area 93 is sandwiched.

FIG. 8 shows an example in which an additional write area 94 and a test writing area 95 are positioned on the outer track side and the inner track side of a lead-in area 91, respectively, as the lead-in area 91 is sandwiched.

In other words, the test writing area 95 is provided right before the lead-in area 91. The area at the beginning end part of the main data area 92, that is, the area right after the lead-in area 91 is the additional write area 94.

Here, preferably, the additional write area 94 and the test writing area 95 are provided at the positions physically close to each other as close as possible. The examples shown in FIGS. 7A to 7C and FIG. 8 are examples that satisfy this preference.

In the case in which perforated marks 6 are additionally written on the reflective layer 4 on the read-only optical disc 90 in the same format as the data record format with embossed pit arrays, it is necessary to perform test write at the position close to the additional write area 94 as close as possible and to determine the optimum recording conditions.

In microscopic view, it is difficult to form the reflective layer 4 to have a uniform thickness throughout the surface of the disc. On this account, in recording perforated marks 6, the nonuniformity of the microtopology of the surface of the reflective layer 4 has great influence on recording perforated marks 6, and it is necessary to perform test write near the area in which additional information is actually recorded and to determine the optimum recording conditions.

As described above, for recording additional information on the reflective layer on the read-only optical disc, it is known that a barcode is recorded in the DVD's BCA. A high degree of accuracy is not demanded to this scheme because it is sufficient to perforate a hole having a diameter of about 10 micrometer for the barcode. However, as described in the embodiment, in the case in which the same signals as main data such as the EFM+ modulation signals are recorded, it is necessary to record information in an accuracy level of 0.01 micrometer, which leads to the difficulty that data is not recorded properly at the accuracy of the barcode level.

In consideration of this, as shown in the examples in FIGS. 7a to 7C, it can be thought as the most adequate that test write is performed on the outer side of the minimum necessary area as the lead-out area 93 to determine the recording conditions and additional recording is performed in the area on the inner side of the lead-out area 93 very close to the test writing area 95. Alternatively, as shown in FIG. 8, it is also adequate that test write is performed right before the lead-in area 91 to determine the recording conditions and additional recording is performed in the area on the outer side of the lead-in area 91 very close to the test writing area 95.

For the case in which the additional write area 94 and the test writing area 95 are provided on the inner side and the outer side of the lead-out area 93, various examples can be considered as those shown in FIGS. 7A, 7B and 7C. It is sufficient to decide the arrangement also in consideration of the specifications of the lead-out area 93 as the DVD standards.

The following standards are defined for the lead-out area 93.

1. In the case in which the length to the radial position of the end of the main data area 92 is below 34 mm, the length to the radial position of the end of the lead-out area 93 is at least 35 mm or longer.

2. In the case in which the length to the radial position of the end of the main data area 92 is 34 to 57.5 mm, the length to the radial position of the end of the lead-out area 93 is at least the length to the radial position of the end of the main data area 92+1 mm or longer.

3. In the case in which the length to the radial position of the end of the main data area 92 is 57.5 to 58 mm, the length to the radial position of the end of the lead-out area 93 is at least 58.5 mm or longer.

Generally, the radial position of the end of the main data area 92 depends on the data volume of content data to record. For example, in the case in which the data size of the content data to record is small, some cases fall in the definition 1. In this case, the radial dimension of the lead-out area 93 is 1 mm at the minimum, but the smaller the data volume of content data is (that is, the main data area 92 ends on the inner track side), the more increased the radial dimension of the lead-out area 93 is.

In the case that falls in the definition 2, the radial dimension of the lead-out area 93 can be 1 mm at the minimum.

In the case that falls in the definition 3, the radial dimension of the lead-out area 93 can be 1 mm to 0.5 mm at the minimum, depending on the radial position of the end of the main data area 92.

It is described above that the additional write area 94 and the test writing area 95 are provided on the inner side and the outer side of the lead-out area 93, because it is preferable that the additional write area 94 and the test writing area 95 are physically close to each other as close as possible. This is applied to the lead-out area 93 for consideration, the smaller the radial dimension of the lead-out area 93 is, the physically closer to each other the additional write area 94 and the test writing area 95 are. Therefore, preferably, the radial dimension of the lead-out area 93 is made smaller as much as possible.

In the case in which the data volume of content data is large and the length to the radial position of the end of the main data area 92 (including the additional write area 94) is 58 mm, it is sufficient that the radial dimension of the lead-out area 93 is 0.5 mm. Thus, the additional write area 94 and the test writing area 95 are separated from each other in the radial direction only in the distance of 0.5 mm, which is the most preferable range.

In addition, in the case in which the length to the radial position of the end of the main data area 92 (including the additional write area 94) is 57.5 mm, it is sufficient that the radial dimension of the lead-out area 93 is 1.0 mm. Therefore, the additional write area 94 and the test writing area 95 are separated from each other in the radial direction only in the distance of 1.5 mm, which can be said that it is also the preferable range.

For example, in the case in which the radial dimension of the lead-out area 93 is about 1 mm and the additional write area 94 and the test writing area 95 are provided on the inner side and the outer side of the lead-out area 93, (that is, the test writing area 95 is separated from the additional write area 94 in the distance of 1 mm), practically, the recording conditions decided in the test write in the test writing area 95 can be reflected as the preferable recording conditions in the additional write area 94 as well.

In consideration of this, for example, in the case in which the case falls in the definition 1 and the radial dimension of the lead-out area 93 is large, it is sufficient as shown in FIG. 7B that dummy data is recorded to move the radial position of the end of the main data area 92 on the outer track side and the radial dimension of the lead-out area 93 is about 1 mm.

In addition, for example, in order to further reduce the radial dimension of the lead-out area 93 as small as about 0.5 mm, it can be also considered that dummy data is used to move the radial position of the end of the main data area 92 to the position of about 58 mm.

Moreover, the degree of allowance of the radial dimension of the lead-out area 93, that is, the degree of the range of separating the additional write area 94 from the test writing area 95 in which a highly accurate additional recording can be performed depends on the material of the reflective layer 4 or the uniformity of the reflective layer 4 when deposited. In order to arrange the additional write area 94 and the test writing area 95 close to each other as close as possible, as described above, it is adequate to use dummy data depending on the data volume of content data.

Next, an exemplary configuration of the additional information recording unit 150 in the additional write process described in FIG. 1 and the process steps of the additional write process will be described.

Figure 9:
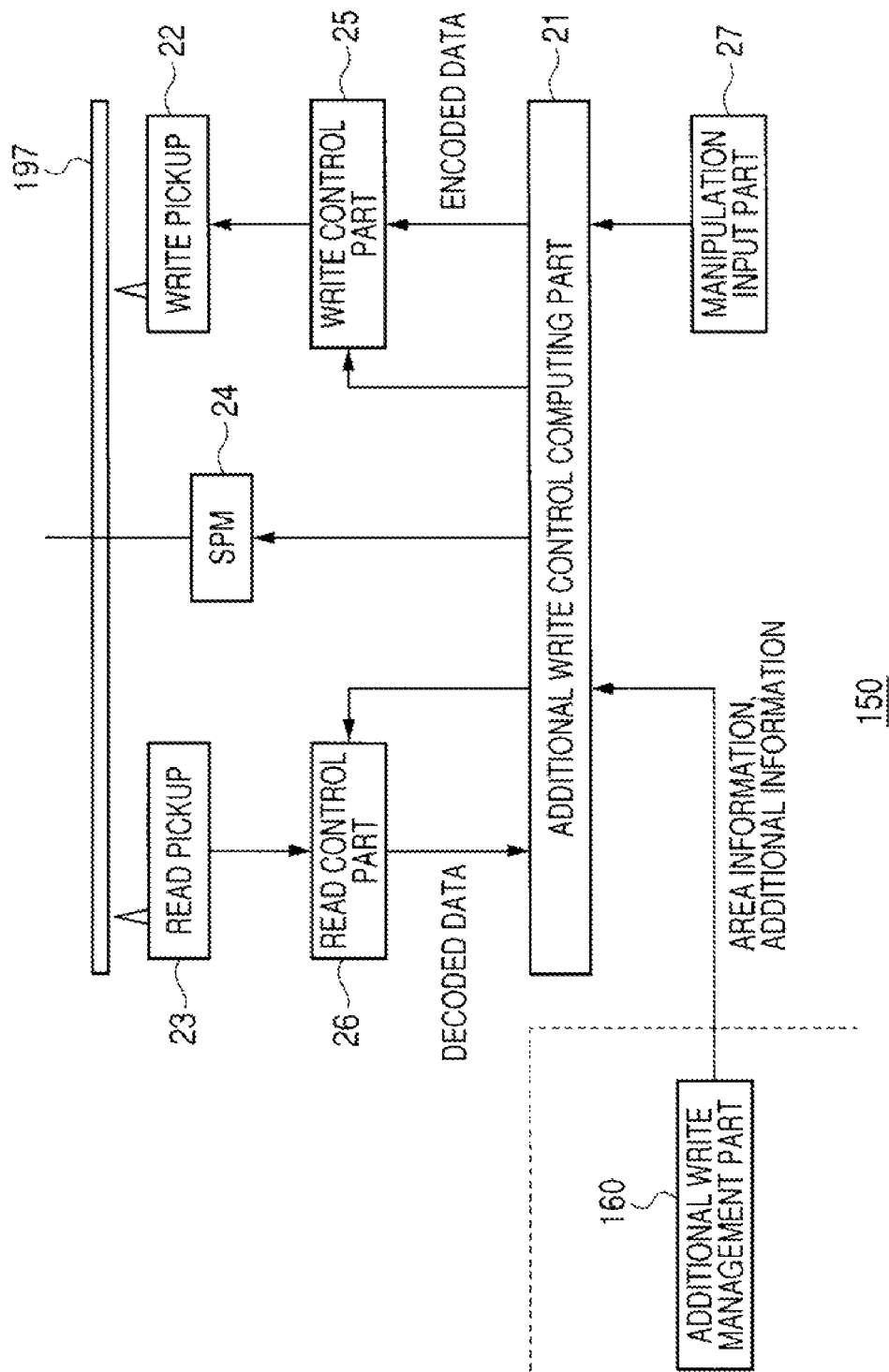
FIG. 9 shows a block diagram depicting an additional information recording unit according to an embodiment.

FIG. 9 shows a block diagram depicting the additional information recording unit. The additional information recording unit 150 has an additional write control computing part 21, a write pickup 22, a read pickup 23, a spindle motor 24, a write control part 25, a read control part 26, and a manipulation input part 27.

A bonded optical disc 197 on which additional information is written in the additional write process is placed on a turntable, not shown, and is rotated by the spindle motor 24.

The write pickup 22 records additional information or test data onto the bonded optical disc 197, and the read pickup 23 reads the recorded data.

For example, the write pickup 22 outputs laser having a wavelength of 660 nm. Laser power can be changed in accordance with an instruction from the write control part 25, and the power is about 100 mW at the maximum, for example. Laser outputted from the write pickup 22 forms perforated marks 6 on the bonded optical disc 197, the perforated marks 6 being formed by dissipating or decreasing the reflective layer 4.

For example, the read pickup 23 outputs laser having a wavelength of 635 or 650 nm. Laser power is about 0.2 mW. The read pickup 23 receives the reflected light of outputted laser, and acquires the signals of information read out of the bonded optical disc 197 from the information of the received reflected light.

The write control part 25 controls the operation of the write pickup 22 for writing supplied data onto the bonded optical disc 197 by the write pickup 22. In other words, the write control part 25 generates laser drive signals based on the supplied data (the encoded data of test data or additional information), and allows the write pickup 22 to output laser. In addition, at this time, the write control part 25 controls laser power based on an instruction from the additional write control computing part 21. Moreover, the write control part 25 controls the write position and the focusing of the write pickup 22 to record perforated marks 6 at predetermined positions based on an instruction from the additional write control computing part 21.

The read control part 26 allows the read pickup 23 to output laser for reading information out of the bonded optical disc 197 as well as decodes information read as the information of reflected light to acquire decoded data as test data or additional information. In addition, the read control part 26 controls the read position and the focusing of the read pickup 23 to read information out of the bonded optical disc 197.

The additional write control computing part 21 performs the drive control of the spindle motor 24, the operation control of the write control part 25, and the operation control of the read control part 26 as the operations of test write and recording additional information performed by the additional information recording unit 150.

As described in FIG. 1, the additional write management part 160 supplies additional information and area information to be recorded in the additional write area 94, and the additional write control computing part 21 acquires these items of information and performs and controls the operation of the additional write process. In this case, the area information is position information (address) of the additional write area 94 and the test writing area 95.

The additional write control computing part 21 performs and controls the operation of recording test write and additional information based on information from the additional write management part 160 and operator's manipulation input through the manipulation input part 27.

First, in performing test write recording, the additional write control computing part 21 instructs the write control part 25 to make access to the test writing area 95, and allows the write pickup 22 to move to the test writing area 95. Then, the additional write control computing part 21 generates test data, encodes the test data, and supplies the encoded data to the write control part 25. Furthermore, the additional write control computing part 21 also instructs laser power in writing data. Thus, the write control part 25 drives the write pickup 22 so as to form perforated marks 6 in the test writing area 95 based on the encoded data as test data.

In addition, in performing test write recording, the additional write control computing part 21 also instructs the read control part 26 to make access to the test writing area 95 for reproduction by the read pickup 23. In other words, the additional write control computing part 21 instructs reproducing the portion of the perforated marks 6 recorded by the write pickup 22. Thus, the read pickup 23 reads test data, and the additional write control computing part 21 acquires data decoded by the read control part 26. The additional write control computing part 21 performs the evaluation of the decoded data such as the detection of the error rate, and decides the optimum recording conditions depending on the result.

Moreover, in recording the additional information, the additional write control computing part 21 instructs the write control part 25 to make access to the additional write area 94 and allows the write pickup 22 to move to the additional write area 94. Then, the additional write control computing part 21 encodes the additional information, and supplies the encoded data to the write control part 25. Furthermore, the additional write control computing part 21 also instructs the recording conditions such as laser power in writing data. Therefore, the write control part 25 drives the write pickup 22 so as to form perforated marks 6 in the additional write area 94 based on the encoded data as additional information.

In addition, in recording the additional information, the additional write control computing part 21 also instructs the read control part 26 to make access to the additional write area 94 for reproduction by the read pickup 23. In other words, the additional write control computing part 21 instructs reproducing the portion of the perforated marks 6 recorded by the write pickup 22. Thus, the read pickup 23 reads the additional information, and the additional write control computing part 21 acquires data decoded by the read control part 26. The additional write control computing part 21 performs the evaluation of the decoded data such as the detection of the error rate, and determines whether additional information is properly recorded.

Figure 10:
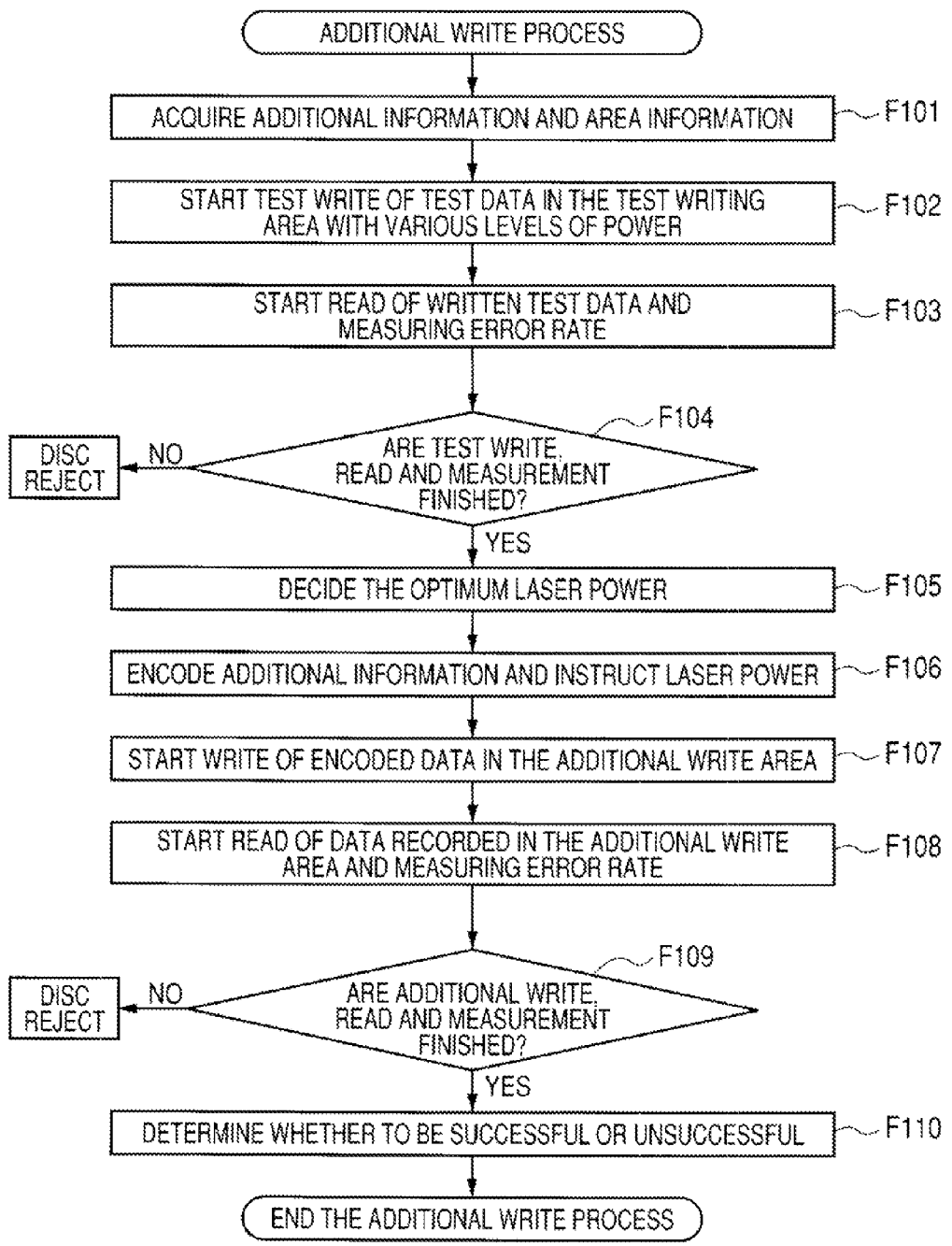
FIG. 10 shows a flow chart depicting the process steps of an additional write process in the disc fabrication process steps according to the embodiment.

FIG. 10 shows the process steps of the additional write process done by the additional information recording unit 150.

The bonded optical disc 197 fabricated in the bonding process is mounted on the additional information recording unit 150, and then the operation shown in FIG. 10 is started automatically, or in response to operator's manipulation input, for example.

First, in Step F101, additional information and area information is acquired from the additional write management part 160.

In Step F102, based on the control done by the additional write control computing part 21, the write control part 25 drives the write pickup 22 to start test write of test data in the test writing area 95. In this case, the additional write control computing part 21 instructs the write control part 25 to perform test write of test data so as to change laser power step by step. For example, laser power is changed by 1 mW each from 70 mW to 95 mW. Therefore, in the test writing area 95, test data is recorded as data strings of perforated marks 6 at each level of laser power of 70 mW, 71 mW, 72 mW . . . 95 mW.

After test write recording is started in this manner, subsequently, in Step F103, based on the control done by the additional write control computing part 21, the read control part 26 drives the read pickup 23 to start reading the test data in test write and measuring the error rate.

In other words, the read pickup 23 reads the portions of the test write of test data started at each level of laser power as described above, right after the data is recorded. Then, the read control part 26 decodes the read test data, and supplies the decoded data to the additional write control computing part 21.

The additional write control computing part 21 measures the error rate of the decoded data, and evaluates the data quality.

The test write of test data started in Step F102, and the read of the test data in test write started in F103 are performed. In accordance with performing test write by changing laser power step by step, the additional write control computing part 21 measures the error rate of test data read at each level of laser power when recorded.

In Step F104, the process waits for the completion of the test write and read of test data and the measurement of the error rate at each level of laser power.

Then, at the point at which these are completed, in Step F105, laser power is decided as the optimum recording conditions for the perforated mark 6. In other words, since the error rate of each item of test data recorded at each level of laser power from 70 mW to 95 mW is measured, it is sufficient that laser power having the most excellent error rate is set to the optimum laser power.

The optimum laser power is decided, and then additional information is subsequently recorded in the additional write area 94.

In Step F106, the additional write control computing part 21 encodes additional information, and forwards it to the write control part 25. In addition, at this time, the additional write control computing part 21 instructs the write control part 25 to record information at the laser power decided in Step F105.

In Step F107, based on the control done by the additional write control computing part 21, the write control part 25 starts the operation of driving the write pickup 22 to write the encoded data in the additional write area 94.

Moreover, when writing is started, subsequently in Step F108, based on the control done by the additional write control computing part 21, the read control part 26 drives the read pickup 23 to start reading additional information out of the additional write area 94 and measuring the error rate.

In other words, as described above, the read pickup 23 reads the recorded portion of additional information thus started right after the additional information is recorded. Then, the read control part 26 decodes the read additional information, and supplies the decoded data to the additional write control computing part 21. The additional write control computing part 21 measures the error rate of the decoded data, and evaluates the data quality.

In Step F109, the process waits for the completion of the write and read of additional information and the measurement of the error rate.

Then, these are completed, and the process goes to Step F110. The additional write control computing part 21 determines from the measured error rate whether additional information is successfully or unsuccessfully recorded in a proper manner.

If it is successful, it means that the additional write process is properly finished and the read-only optical disc 90 is completed. Moreover, if it is unsuccessful because the error rate is degraded due to some cause, it is determined that the disc is a defective disc.

In accordance with the process steps described above, the additional write process is performed.

Then, the read-only optical disc 90 of the DVD format is fabricated in the process steps described in FIGS. 1 to 10, for example. The read-only optical disc 90 thus fabricated is a disc on which data as additional information is recorded in the additional write area as a record data string formed of perforated marks that are made by dissipating or decreasing a part of the reflective layer. In other words, the read-only optical discs 90 can be fabricated on which unique additional information is recorded for the individual discs.

In addition, since the perforated marks are recorded, test write recording is performed in the test writing area to decide the optimum recording conditions. Then, the perforated marks are recorded under the optimum recording conditions, whereby additional information is recorded properly. Therefore, as information that can be reproduced in the same process as that of the embossed pit array in a typical reproducing apparatus, unique additional information can be recorded on individual discs.

Moreover, in the example shown in FIG. 10, laser power in recording perforated marks 6 is set as the recording conditions. However, for a so-called write strategy, the pulse width of the optimum laser drive pulse or the conditions of pulse level may be decided by test write.

In addition, for the evaluation of the read signals in test write, in addition to the measurement of the error rate, it can be also considered to measure the jitter value or asymmetry of the reproduced signals.

Moreover in the embodiment, as discussed above, the test writing area 95 and the additional write area 94 are provided at the positions physically close to each other such as the outer track side and the inner track side of the lead-out area 93, respectively, as the lead-out area 93 is sandwiched, or the inner track side and the outer track side of the lead-in area 91, respectively, as the lead-in area 91 is sandwiched. On this account, the recording conditions decided by test write recording become the proper recording conditions for recording perforated marks in the additional write area, and the quality of additional information that is recorded as the perforated marks 6 in the additional write area 94 can be further improved.

Furthermore, although the embodiments exemplify the application as it is implemented as the read-only optical disc 90 of the DVD format, the application can be also applied to a read-only optical disc medium of another disc format and a method of fabricating the same.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A read-only optical disc medium comprising:
   an information recording area in which information is recorded by means of an embossed pit array formed in a convexo-concave shape having a reflective layer deposited thereon;
   a test writing area which is used for test write recording of a mark formed by dissipating or decreasing the reflective layer; and
   an additional write area, within the information recording area, in which a record data string is formed of a mark by dissipating or decreasing the reflective layer under a recording condition decided in accordance with a result of test write recording performed in the test writing area, wherein the record data string formed of the mark is on a recording track in the additional write area.

2. The read-only optical disc medium according to claim 1, wherein in the information recording area, a lead-in area, a main data area and a lead-out area are formed from an inner track side to an outer track side.

3. The read-only optical disc medium according to claim 2, wherein in the main data area, content data and dummy data are recorded.

4. The read-only optical disc medium according to claim 2, wherein the test writing area is provided on the outer track side than the lead-out area is provided.

5. The read-only optical disc medium according to claim 2, wherein the test writing area is provided on the inner track side than the lead-in area is provided.

6. The read-only optical disc medium according to claim 2, wherein the additional write area is provided near a position of a terminal end of the main data area.

7. The read-only optical disc medium according to claim 2, wherein the additional write area is provided near a position of a beginning end of the main data area.

8. The read-only optical disc medium according to claim 2, wherein the additional write area is provided on the inner track side of the lead-out area, and the test writing area is provided on the outer track side thereof, as the lead-out area is sandwiched.

9. The read-only optical disc medium according to claim 2, wherein the additional write area is provided on the outer track side of the lead-in area, and the test writing area is provided on the inner track side thereof, as the lead-in area is sandwiched.

10. A method of fabricating a read-only optical disc medium comprising the steps of:
    forming an optical disc master having a convexo-concave shape thereon based on an information signal and having a flat area to be a test writing area and an additional write area;

shaping a disc substrate having the convexo-concave shape and the flat area on an information recording surface thereof by using a stamper prepared from the optical disc master;

depositing a reflective layer on the information recording surface to form an embossed pit array in the convexo-concave shape having the reflective layer deposited thereon and the test writing area and the additional write area as the flat area having the reflective layer deposited thereon; and performing test write of a mark formed by dissipating or decreasing the reflective layer in the test writing area, forming a mark by dissipating or decreasing the reflective layer in the additional write area under a recording condition decided in accordance with a result of the test write recording, and forming a record data string formed of the mark on a recording track in the additional write area.

11. The read-only optical disc medium according to claim 1, wherein the record data string formed of the mark in the additional write area has a same modulation as the embossed pit array in the information recording area.

12. The method of fabricating a read-only optical disc medium according to claim 10, wherein the record data string formed of the mark is formed using a same modulation mode as a modulation mode corresponding to the embossed pit array.

* * * * *

UNITED STATES PATENT AND TRADEMARK OFFICE
CERTIFICATE OF CORRECTION

PATENT NO. : 7,969,855 B2
APPLICATION NO. : 12/023655
DATED : June 28, 2011
INVENTOR(S) : Takayuki Asahina Page 1 of 1

It is certified that error appears in the above-identified patent and that said Letters Patent is hereby corrected as shown below:

ON THE TITLE PAGE ITEM 73:

In the "Assignee" section, please replace "Sony Corporation, Tokyo (JP)" with --Sony Disc & Digital Solutions, Inc., Tokyo (JP)--.

Signed and Sealed this
Twentieth Day of September, 2011

David J. Kappos
*Director of the United States Patent and Trademark Office*